United States Patent [19]
Hu

[11] Patent Number: 5,722,066
[45] Date of Patent: Feb. 24, 1998

[54] PSTN TRANSACTION PROCESSING NETWORK EMPLOYING WIRELESS TRANSCEIVERS

[75] Inventor: Michael W. Hu, Menlo Park, Calif.

[73] Assignee: Wireless Transactions Corporation, Sunnyvale, Calif.

[21] Appl. No.: 380,776

[22] Filed: Jan. 30, 1995

[51] Int. Cl.[6] .................................................. H04Q 7/20
[52] U.S. Cl. ..................... 455/403; 455/557; 379/91.01
[58] Field of Search ............................ 379/58, 59, 91, 379/63, 144, 91.01; 235/379, 380; 455/403, 557

[56] References Cited

U.S. PATENT DOCUMENTS

| | | |
|---|---|---|
| 4,776,003 | 10/1988 | Harris . |
| 4,860,341 | 8/1989 | D'Avello et al. ........................ 379/91 |
| 4,890,315 | 12/1989 | Bendixen et al. ........................ 379/59 |
| 4,959,851 | 9/1990 | Tobolski, Jr. et al. .................... 379/59 |
| 4,972,457 | 11/1990 | O'Sullivan ............................. 379/59 |
| 5,007,084 | 4/1991 | Materna et al. . |
| 5,144,649 | 9/1992 | Zicker et al. . |
| 5,228,053 | 7/1993 | Miller et al. . |
| 5,265,033 | 11/1993 | Vajk et al. . |
| 5,280,625 | 1/1994 | Howarter et al. . |
| 5,334,824 | 8/1994 | Martinez ............................... 235/380 |
| 5,406,615 | 4/1995 | Miller, II et al. ....................... 379/59 |
| 5,408,513 | 4/1995 | Busch et al. ........................... 379/59 |
| 5,444,763 | 8/1995 | Lazaridis et al. . |
| 5,465,288 | 11/1995 | Falvey et al. .......................... 379/58 |
| 5,497,424 | 3/1996 | Vanderpool ......................... 379/59 X |
| 5,541,925 | 7/1996 | Pittenger et al. . |
| 5,583,918 | 12/1996 | Nakagawa ............................. 379/61 |
| 5,608,778 | 3/1997 | Partridge, III ......................... 379/58 |

*Primary Examiner*—Dwayne Bost
*Assistant Examiner*—William G. Trost
*Attorney, Agent, or Firm*—Townsend and Townsend and Crew LLP; Henry K. Woodward

[57] ABSTRACT

A business transaction network including a wireless communication link for coupling a card transaction terminal to a host computer through the public switched telephone network (PSTN). The wireless link includes two interface units for interfacing with the terminal and with the PSTN and encoding and decoding digital data based on analog signals from the terminal and from the PSTN, and two spread spectrum wireless transceivers.

7 Claims, 4 Drawing Sheets

PSTN TRANSACTION PROCESSING NETWORK EMPLOYING WIRELESS TRANSCEIVERS

BACKGROUND OF THE INVENTION

This invention relates generally to business transaction networks which use the public switched telephone networks (PSTN) to connect a transaction terminal to a computer processing center, and more particularly the invention relates to such a network which employs wireless transceivers to connect a remote location to the PSTN.

Many credit, debit, and stored value card processing systems have been installed in which a card transaction terminal at a point of sale is connected to the dial-up public switched telephone network (PSTN) for the purpose of authorizing a payment transaction and then capturing the sales transaction information for submission to a clearing and settlement processing service.

Conventional card transaction terminal units include point of sale (POS) terminals, electronic cash registers (ECRs), electronic benefits transfer terminals (EBTs), automatic teller machines (ATMs), plus other devices that obtain sales transaction data that in turn is stored, processed, and transmitted through the PSTN communication network. This network provides a low cost alternative for merchants with small to medium transaction volume to authorize a sales transaction on-line.

Typically the cardholder account number, merchant identification, card issuer number, card expiration date, transaction amount and other card information pertaining to the sales transaction are entered into the terminal unit. In many cases some of the data is obtained electronically by swiping the card (if it has a magnetic stripe) through a magnetic stripe card reader. Other transaction information, including the transaction amount, is keyed into the terminal unit by the sales cashier using a key pad.

A difficulty with conventional credit inquiry and draft capture systems is that there are many locations at the point of sale which do not have readily available a dial-up communication link to the public switched telephone network. The cost and inconvenience of extending the communication wiring to certain cashier positions would be too expensive and in some cases not feasible. Such locations include street fairs, convention centers, hotel lobbies, airport concourses, stadiums and parking lots where installation of new wirings can be prohibitive or impossible. This limitation prevents the merchant or retailer from being able to accept any form of payment, other than cash, for the sale without accepting the risk of default on the part of the purchaser. Essentially, it limits the merchant or retailer to cash sales only. This restriction significantly limits the potential sales for some merchants or would expose them to unreasonable risk in accepting a card payment if it cannot be authorized.

SUMMARY OF THE INVENTION

The present invention is directed to eliminating the need for a wire connection between a card transaction terminal and the PSTN network and thereby increasing the flexibility in using the card transaction terminal in presently inaccessible locations.

Briefly, a pair of wireless transceivers are provided with interfaces to permit the passage of information between the transaction terminal and a PSTN network in accordance with Bell 212A/CCITT V.22 standards. Any card transaction terminal having an RJ-11 telephone interface connector can then be remotely placed from an RJ-11 telephone jack that is connected to the PSTN network.

More particularly, the interfaces detect and transmit off-hook signals from a terminal to the PSTN, transmit a dial-tone from the PSTN to the terminal, convert and send a dial sequence from the terminal to the PSTN, transmit a ring back signal to the terminal, send a log-on sequence to the PSTN and the computer center, transmit an enable signal from the computer center back to the terminal, send and receive data, transmit an end of transaction signal back to the terminal, and then drop the carrier.

In accordance with a feature of the invention, the interfaces include spread spectrum transceivers so that the wireless communication can utilize the Instrumentation, Scientific and Medical (ISM) frequency bands which do not require an operating license from the Federal Communications Commission (FCC). Transmission power is limited to one watt but this is sufficient power for transmitting within a building or within one mile in unobstructed space.

The invention and objects and features thereof will be more readily apparent from the following detailed description and appended claims when taken with the drawing.

DETAILED DESCRIPTION OF ILLUSTRATIVE EMBODIMENTS

Figure 1:
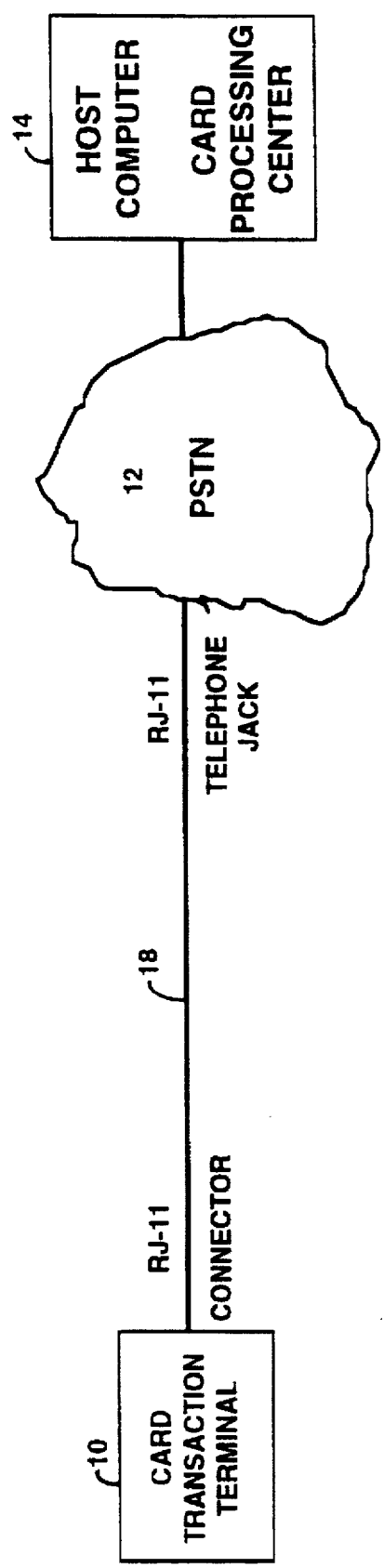
FIG. 1 illustrates a prior art business transaction network in which a card transaction terminal is directly connected by cable to the PSTN and a host computer for authorization card sales transactions.

FIG. 1 illustrates the conventional business transaction network interconnecting a card transaction terminal to a host computer through the PSTN. The typical sequence of events after a card is swiped on the card transaction terminal includes: Terminal 10 dials out on PSTN 12 to a destination host computer 14 at the card processing center. Once the telephone connection is made, the host computer polls the card transaction terminal to send a transaction for approval. After verification, host computer 14 sends the authorization back to the card transaction terminal 10. The transaction session ends after host computer 14 receives an acknowledgment back from the card transaction terminal verifying that the terminal successfully received the authorization response. A cable 18 directly connects an RJ-11 connector on terminal 10 to an RJ-11 telephone jack in PSTN.

Figure 2:
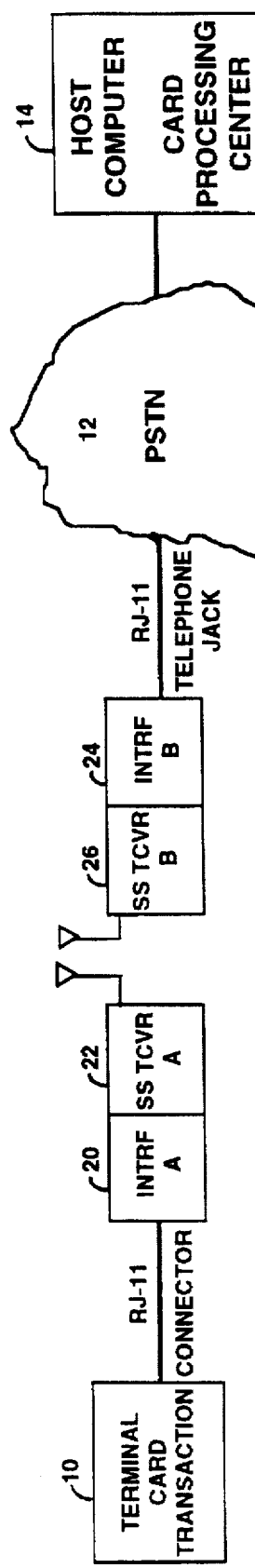
FIG. 2 illustrates a business transaction network in accordance with the invention in which radio transceivers interconnect the card transaction terminal and the PSTN.

FIG. 2 illustrates a transaction network as modified in accordance with the invention. The cable 18 in FIG. 1 is replaced by two unique interfaces and transceivers. The first interface 20, is between the RJ-11 output of card transaction terminal 10 and a Spread Spectrum Transceiver 22 (SS TCVR A). The second interface 24 is between the Spread Spectrum Transceiver 26 and the RJ-11 telephone jack that interfaces with the PSTN.

Figure 3:
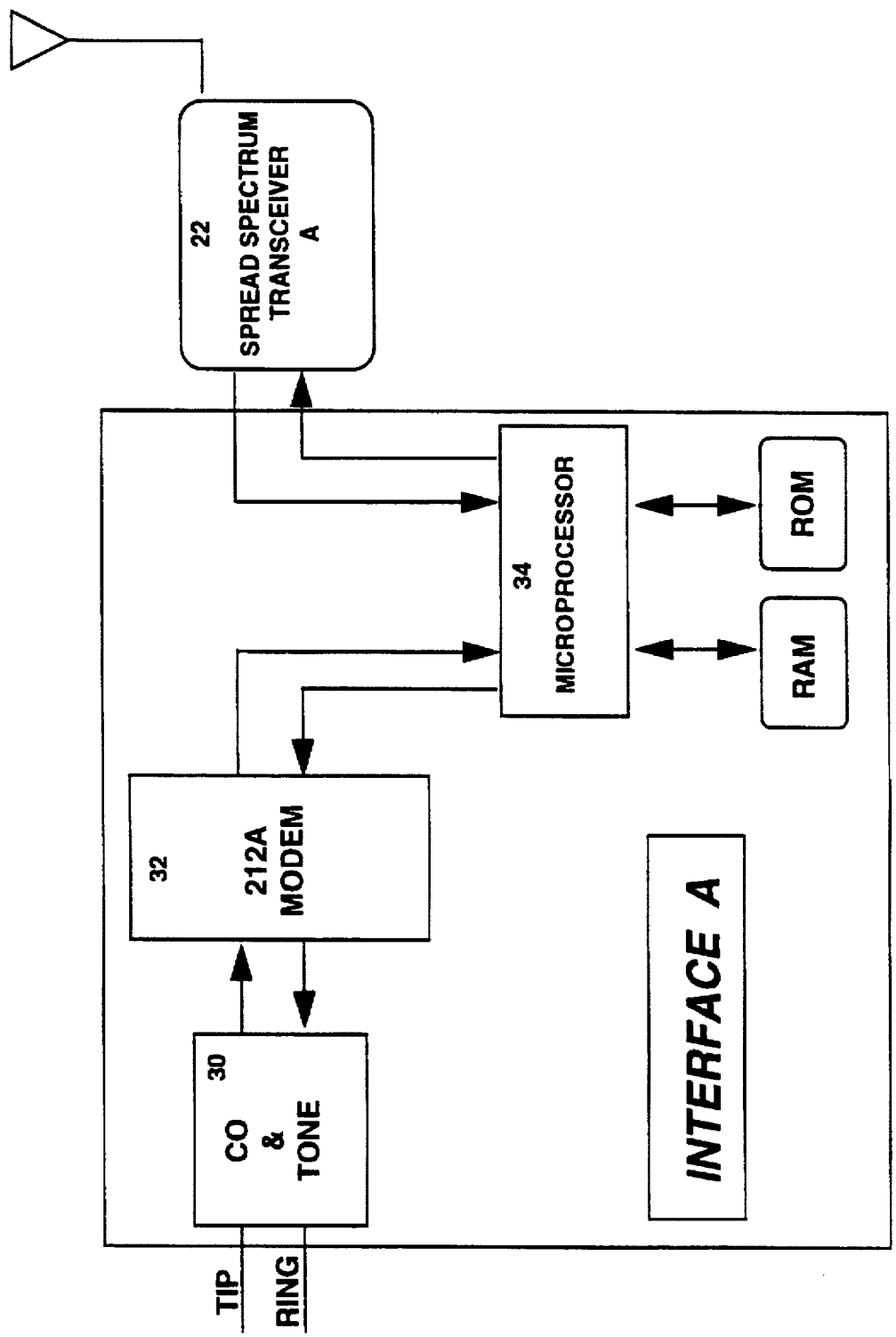
FIG. 3 is a functional block diagram of an interface with the terminal and a transceiver in the network of FIG. 2.

A functional block diagram of interface 20 is shown in FIG. 3. The "CO and Tone" block 30 provides the circuitry to sense the loop current from "Tip" and "Ring" for the detection of "off-hook," "on-hook," and "ring" generation and also provides "dial-tone," "busy," or "ring" signal tones to the card transaction terminal. Implementation of block 30 circuitry is known in the art using commercially available components. The modem 32 (Bell 212A/CCITT V.22) converts the modulated analog signals into digital information. The microprocessor 34 decodes all the modem signals including off-hook, on-hook, dial-tone, ring, busy, and the sales transaction data, and encodes them to the appropriate protocol and packetized data format required by the Spread Spectrum Transceiver 22. The procedure is reversed for communication from the host computer through the PSTN to the transaction terminal.

Figure 4:
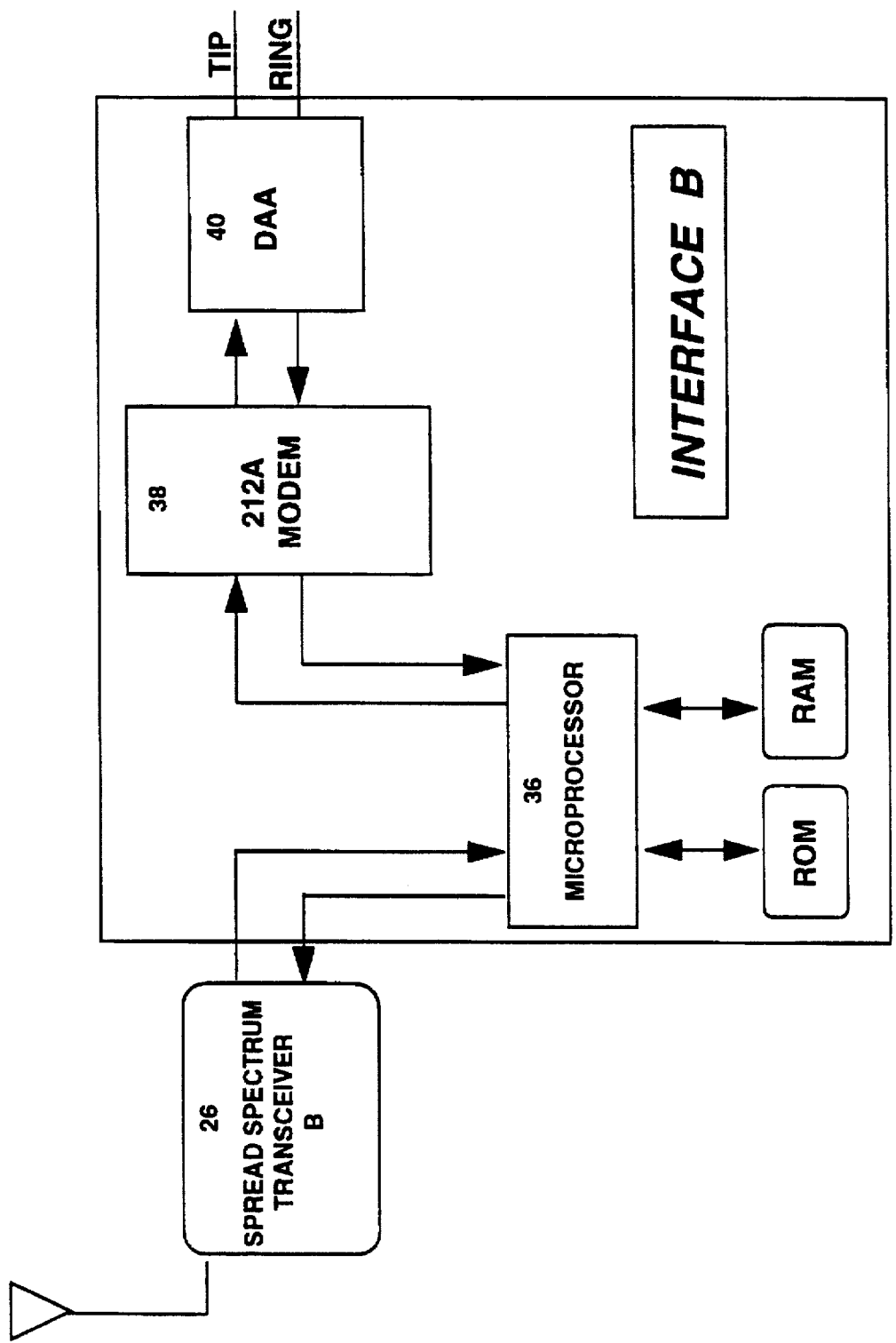
FIG. 4 is a functional block diagram of an interface with the PSTN and a transceiver in the network of FIG. 2.

A functional block diagram of interface 24 is shown in FIG. 4. Again, microprocessor 36 processes all the digital data from the spread spectrum transceiver 26 and passes the data to the modem 38. The modem 38 converts the digital information back to modulated analog signals. The Data Access Arrangement (DAA) 40 is the protective interface circuitry required by the telephone company, and is known in the art. Once the initial telephone connection is established between the card transaction terminal and its destination card processing host computer for transaction authorization, Interface 20 and Interface 24 continuously monitor for transmission errors and ensure error-free data transmission between the two Spread Spectrum transceivers 22, 26. The two interfaces A, B also log error statistics and perform other "house-keeping" functions such as: address, spreading code, and frequency channel selections for the transceivers.

Specifications for one embodiment of the interface and transceiver are as follows:

| Transceiver | |
|---|---|
| Frequency Band: | 902–928 MHz |
| Modulation Scheme: | Direct Sequence Spread Spectrum (Meets FCC Part 15.247 rules) |
| Effective data rate: | 9.6 kb/s (standard) |
| Transmitter Power: | 200 mW |
| | 1000 mW |
| Range: | 1000 ft. @ 200 mW inside typical buildings |
| | 1 mi. @ 200 mW line-of-sight |
| Communications: | Bell 212A, 103 Autodial |
| | CCITT v.22 bis with V.42 bis |
| | MNP2-5 RJ-11 JConnector |
| | Host dialing automatic - 20 digit |
| | Supports all common synchronous & asynchronous protocols |

Following is a typical sequence of signals and data flows between the card transaction terminal, the wireless transceivers, the PSTN, and the card processing center host computer. In this example the communication is initiated at the point of sale, however, the communication can be initiated by the host computer. The two transceivers are synchronized in such a way that, whenever one transmits, the other receives.

| Card Transaction Terminal | Signal | Interface A & SS TCVR A | Signal | SS TCVR B & Interface B | Signal | PSTN |
|---|---|---|---|---|---|---|
| Off-hook | → | (1) Detect off-hook signal<br>(2) Produce and send off-hook code to SS TVCR B | → | (3) Receive off-hook from SS TCVR A<br>(4) Convert off-hook code to off-hook signal<br>(5) Send off-hook signal to PSTN<br>(6) Detect dial-tone signal | →<br>← | Off-hook<br>Dial-tone |
| Dial-tone | ← | (8) Convert dial-tone code to dial-tone signal | ← | (7) Produce and send dial-tone code to SS TCVR A | | |
| Dial-sequence | → | (9) Convert & send dial sequence code to SS TCVR B | → | (10) Convert dial sequence code to DTMF<br>(11) Send dial sequence to PSTN<br>(12) Detect ring back, carrier or busy tones<br>(13) Convert analog signal to digital data and generate appropriate codes | →<br>← | Dial sequence<br>Ringback, carrier or busy tones |
| Ringback, carrier or busy tones | ← | (15) Convert coded data and generate appropriate analog signal | ← | (14) Send coded data to SS TCVR A | | |
| Send carrier tone and transaction log-on sequence to host computer | → | (16) Convert carrier tone and log on sequence analog signal to digital data | → | (17 Convert carrier code digital data to analog signals | → | Send carrier tone and transaction log-on sequence to host computer |
| Receive ENQ | ← | (18) Convert digital data to analog signal | ← | (19) Convert analog signal, ENQ, from PSTN to digital | ← | Send ENQ |
| Send/receive data | ←→ | (20) Convert analog signal to digital | ←→ | (21) Convert digital data to analog signal | ←→ | Receive/send data |
| Receive EOT | ← | (23) Convert EOT code to EOT analog signal | ← | (22) Convert EOT analog signal to digital code | ← | Send EOT |
| Drop carrier | → | (24) Detect carrier drop & generate code | → | (25) Convert carrier drop code to analog signal | → | Drop carrier |

The major advantages and improvements of the invention over prior art includes allowing any card transaction terminal to be located from a few feet away to a thousand plus feet away from any RJ-11 telephone jack, allowing any card transaction terminal to be located in areas where telephone wiring is difficult or impossible to install or cost prohibitive, no FCC license is required to operate, and the product is readily implementable in volume and at low cost.

While the invention has been described with reference to a specific embodiment, the description is illustrative of the invention and is not be to construed as limiting the invention. Various modifications and applications may occur to those skilled in the art without departing from the true spirit and scope of the invention as defined by the appended claims.

What is claimed is:

1. A local area wireless business transaction network requiring no FCC site license for temporarily transmitting credit card transactions between a remotely located credit card transaction terminal and a centrally located computer processing center connected to a public switched telephone network, said network comprising:
   a) a standard unmodified card transaction terminal for receiving customer information from a customer card and including an RJ-11 telephone line connector,
   b) a first interface including an RJ-11 connector for mating With said telephone line connector of said terminal and converting analog data signals from said terminal to encoded digital data signals and for decoding digital data signals going to said terminal to analog data signals, said first interface including a tone unit for detecting off-hook signals from the terminal, a first modem for converting analog signals from the terminal to digital signals, circuitry for sensing loop current from Tip and Ring for the detection of off-hook and on-hook conditions and for providing dial-tone, busy, and ring signals to said terminal, and first microprocessor for decoding modem signals including sales transaction data and encoding data to a protocol and packetized data format for spread spectrum transmission,
   c) a first spread spectrum wireless transceiver connected with said first interface for transmitting encoded digital signals from said first interface and for receiving encoded digital signals for said first interface,
   d) a public switched telephone network connected to the centrally located computer processing center and having an RJ-11 network connector,
   e) a second interface including an RJ-11 connector for mating with said network connector and converting encoded digital signals to analog signals going to said network connector and converting analog signals from said network connector to encoded digital signals, said second interface including a second microprocessor for processing spread spectrum transmitted digital data, and a second modem for converting digital data from the second microprocessor to analog signals, and
   f) a second spread spectrum wireless transceiver connected with said second interface for transmitting encoded digital signals from said second interface and for receiving encoded digital signals for said second interface,
      whereby the first and second spread spectrum wireless transceivers transmit encoded data signals in a frequency band and at a power level not requiring an FCC site transmission license.

2. The business transaction network as defined by claim 1 wherein said second interface further includes a data access arrangement as protective interface circuitry for said public switched telephone network.

3. The business transaction network as defined by claim 1 wherein said wireless transceivers operate in the Instrumentation, Scientific and Medical frequency bands.

4. In a local area wireless business transaction network requiring no FCC site license and in which an unmodified card transaction terminal communicates with a host computer through a public switched telephone network for transmitting credit card transactions between a remotely located credit card transaction terminal and a centrally located computer processing center, a communication link comprising a first interface including an RJ-11 connector for mating with a telephone line RJ-11 connector of the terminal and converting analog signals from the terminal to encoded digital signals and for converting encoded digital signals going to the terminal to analog signals, said first interface including a tone unit for detecting off-hook signals from the terminal, circuitry for sensing loop current from Tip and Ring for the detection of off-hook and on-hook conditions and for providing dial tone, busy, and ring signals to said terminal, a first modem for converting analog signals from the terminal to digital signals, and a first microprocessor for decoding modem signals including sales transaction data and encoding data to a protocol and packetized data format for spread spectrum transmission, a first spread spectrum wireless transceiver connected with said first interface for transmitting encoded digital signals from said first interface and for receiving encoded digital signals for said first interface, a second interface including an RJ-11 connector for mating with an RJ-11 network connector of the public switched telephone network and converting encoded digital signals to analog signals going to the public switched telephone network and converting analog signals from the public switched telephone network to encoded digital signals, and a second spread spectrum wireless transceiver connected with said second interface for transmitting encoded digital signals from said second interface and for receiving encoded digital signals for said second interface.

5. The communication link as defined by claim 4 wherein said wireless transceivers operate in the Instrumentation, Scientific and Medical frequency bands.

6. The communication link as defined by claim 4 wherein said second interface further includes a data access arrangement as protective interface circuitry for said public switched telephone network.

7. For use in a local area wireless business transaction network requiring no FCC license and in which an unmodified card transaction terminal communicates with a host computer through a public switched telephone network for transmitting credit card transactions between a remotely located credit card transaction terminal and a centrally located computer processing center, a communication link comprising an interface unit including an RJ-11 connector for mating with a telephone line connector of the terminal and converting analog signals from the terminal to encoded digital signals and for converting encoded digital signals going to the terminal to analog signals, said first interface including a tone unit for detecting off-hook signals from the terminal circuitry for sensing loop current from Tip and Ring for the detection of off-hook and on-hook conditions and for providing dial-tone, busy, and ring signals to said terminal, a first modem for converting analog signals from the terminal to digital signals, and a first microprocessor for decoding modem signals including sales transaction data and encoding data to a protocol and packetized data format for spread spectrum transmission, and a spread spectrum wireless transceiver connected with said interface unit for transmitting encoded digital signals from said interface unit and for receiving encoded digital signals for said interface.

* * * * *